United States Patent
Murai et al.

(10) Patent No.: US 6,756,453 B2
(45) Date of Patent: Jun. 29, 2004

(54) ALICYLIC EPOXY COMPOUNDS AND THEIR PREPARATION PROCESS, ALICYLIC EPOXY RESIN COMPOSITION, AND ENCAPSULANT FOR LIGHT-EMITTING DIODE

(75) Inventors: Kouya Murai, Yokkaichi (JP); Mineo Nishi, Yokkaichi (JP); Masayuki Honda, Yokkaichi (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 10/178,891

(22) Filed: Jun. 25, 2002

(65) Prior Publication Data

US 2003/0098649 A1 May 29, 2003

(30) Foreign Application Priority Data

| Jun. 25, 2001 | (JP) | 2001-191023 |
| Jun. 25, 2001 | (JP) | 2001-191024 |
| Dec. 6, 2001 | (JP) | 2001-373250 |
| Dec. 6, 2001 | (JP) | 2001-373251 |
| Jan. 17, 2002 | (JP) | 2002-009126 |

(51) Int. Cl.$^7$ .................................... C08G 59/22
(52) U.S. Cl. ............... 525/523; 257/787; 257/788; 257/793; 528/88; 549/513; 549/541; 549/542
(58) Field of Search ................ 549/513, 541, 549/542; 528/88; 525/523; 313/512; 257/787, 788, 793

(56) References Cited

U.S. PATENT DOCUMENTS

| 3,336,241 A | 8/1967 | Shokal |
| 6,060,611 A | 5/2000 | Hara et al. |
| 6,232,411 B1 | 5/2001 | Hara et al. |

FOREIGN PATENT DOCUMENTS

| EP | 0 108 720 | 10/1983 |
| EP | 0 545 154 A1 | 6/1993 |
| EP | 0 597 806 A1 | 5/1994 |
| EP | 0 678 512 A1 | 10/1995 |
| EP | 0 678 513 A1 | 10/1995 |
| EP | 0 921 141 A1 | 6/1999 |
| JP | 2001019742 | * 7/1999 |
| JP | 2001019742 | 1/2001 |
| WO | WO 95/13874 | 5/1995 |

* cited by examiner

Primary Examiner—David E Aylward
(74) Attorney, Agent, or Firm—Nixon & Vanderhye P.C.

(57) ABSTRACT

The present invention relates to alicyclic epoxy compounds obtained by selectively hydrogenating aromatic rings of aromatic epoxy compounds in the presence of a hydrogenation catalyst, the concentration of the platinum group element in the product alicyclic epoxy compound being not more than 2 ppm.

21 Claims, No Drawings

ALICYLIC EPOXY COMPOUNDS AND THEIR PREPARATION PROCESS, ALICYLIC EPOXY RESIN COMPOSITION, AND ENCAPSULANT FOR LIGHT-EMITTING DIODE

BACKGROUND OF THE INVENTION

The present invention relates to alicyclic epoxy compounds and their preparation process, alicyclic epoxy resin composition, and encapsulant for light-emitting diode (LED).

Since epoxy compounds have many advantageous properties such as excellent heat resistance, adhesion, water resistance, mechanical strength and electrical properties, epoxy compounds are used in various fields of industries, for example as adhesive, coating material, engineering and construction material, and insulating material for electric and electronic parts.

These epoxy compounds comprise typically aromatic epoxy resins such as diglycidyl ethers of bisphenol A, diglycidyl ethers of bisphenol F, and phenol or cresol novolak type epoxy resins.

LED is used for a variety of commercial products such as display boards, light source for image reading, traffic signals, and large-size display units. In a luminous device comprising LED, the surroundings of the luminous element are generally encapsulated with a transparent resin, especially an epoxy compound because of high adhesiveness, etc., for the purposes of protection of the semiconductor and converging of light.

It is known, however, that the epoxy resins cured with an acid anhydride are subject to a change of quality originating in the acid anhydride used. These epoxy resins also involve the problems such as yellowing which occurs when the cured resin is kept exposed to the open air or to a light source generating ultraviolet rays. In recent years, remarkable progress has been made in the development of high-brightness blue LED (main luminescence at around 460 nm) and the development of LED having main luminescence in the ultraviolet region (e.g. 350–400 nm). Also, improvement in performance of blue LED in addition to the conventional red LED and green LED has enabled display of the three primary colors, and this blue LED is now offered to use for display units. There has further been proposed white LED designed to effect color mixing by combined use of a luminous element and a fluorescent substance, with part or whole of the short wavelength luminescence of the luminous element being converted to the long wavelength luminescence, and this white LED has already been offered to use for illumination, back-lighting and such.

Shortening of the light-emitting wavelength as mentioned above increases the light energy, which tends to cause early deterioration of the encapsulant for LED. For example, Japanese Patent Application Laid-Open (KOKAI) No. 8-148717 describes reduction of light intensity as a result of deterioration of the encapsulant by the heat or light generated from the blue LED. Further, in the case of white LED, as it is of a mixed color, it is feared that its color tone would be varied when the encapsulant has light absorption at a wavelength in the visible region. It is noticeable that the human sense of tonality is particularly sharp to white color. For example, Japanese Patent Application Laid-Open (KOKAI) No. 2000-315826 describes that the direction of measurement of LED could be a causative factor of color shading due to diffraction by the encapsulant and/or other reasons.

As a solution to the problems posed by the light of short wavelength such as mentioned above, Japanese Patent Application Laid-Open (KOKAI) No. 2001-19742 proposes a composition comprising a hydrogenated compound of an aromatic epoxy compound and a cationic curing catalyst. This composition is improved in toughness and coloration of its cured product and also excels in light resistance.

On the other hand, various proposals have been made on the attempt to produce alicyclic epoxy compounds by hydrogenating the aromatic rings of aromatic epoxy compounds.

U.S. Pat. No. 3,336,241 proposes a method in which an organic compound having at least one epoxy group and at least one carbon-carbon double bond is hydrogenated in the presence of a hydrogenation catalyst comprising rhodium or ruthenium carried on an inert carrier such as activated carbon. Japanese Patent Application Laid-Open (KOKAI) No. 11-217379 proposes use of a hydrogenation catalyst comprising rhodium or ruthenium carried on a carbonaceous carrier having a specific surface area in the range of 5 to 600 $m^2/g$ for improving activity or selectivity. Further, Japanese Patent Application Laid-Open (KOKAI) No. 11-199645 proposes an embodiment of an epoxy compound of low chlorine content, which is high in hydrogenation rate and small in loss of epoxy groups, in the above methods.

However, in the hydrogenation method using a noble metal catalyst, transmittance of the obtained alicyclic epoxy compound (encapsulant) in the short wavelength region decreases with the passage of time. Therefore, in case of LED having its main light-emitting wavelength in the short wavelength region, the radial luminous intensity of LED decreases with time caused by such an alicyclic epoxy compound. In case of white LED, there arises the problem that the white color tone is varied due to the distribution of transmittance in the visible light region, caused by the alicyclic epoxy compound.

SUMMARY OF THE INVENTION

The present invention has been made in view of the above circumstances, and its object is to provide alicyclic epoxy compounds (encapsulant) which are small in change of reproducibility, uniformity and stability of hue and also capable of minimizing the decrease of radial luminous intensity of LED with time, and a process for producing such compounds.

To attain the above aim, in the first aspect of the present invention, there is provided alicyclic epoxy compounds obtained by selectively hydrogenating aromatic rings of aromatic epoxy compounds in the presence of a hydrogenation catalyst comprising a platinum group element, the concentration of the platinum group element in the product of alicyclic epoxy compound being not more than 2 ppm.

In the second aspect of the present invention, there is provided an alicyclic epoxy resin composition comprising alicyclic epoxy compound as main component, which alicyclic epoxy compound is obtained by selectively hydrogenating aromatic rings of aromatic epoxy compounds in the presence of a hydrogenation catalyst comprising a platinum group element, the concentration of the platinum group element in the alicyclic epoxy resin composition being not more than 2 ppm.

In the third aspect of the present invention, there is provided an encapsulant for light-emitting diode comprising the alicyclic epoxy resin composition as defined in the above second aspect.

In the fourth aspect of the present invention, there is provided a process for producing an alicyclic epoxy compound which comprises selectively hydrogenating aromatic ring of an aromatic epoxy compound in the presence of a hydrogenation catalyst, and bringing the obtained alicyclic epoxy compound into contact with an adsorbent to remove the platinum group element in said alicyclic epoxy compound.

DETAILED DESCRIPTION OF THE INVENTION

The present invention is explained as follows.

The aromatic epoxy compounds used in the present invention are the aromatic compounds having two or more epoxy groups in the molecule and include various types such as glycidyl ethers, glycidyl esters and glycidylamines.

Typical examples of the said aromatic compounds are epoxy compounds represented by the formula (I) produced from bisphenol A or bisphenol F and epichlorohydrin, and polyglycidyl ethers of phenol or cresol novolak type resins represented by the formula (II).

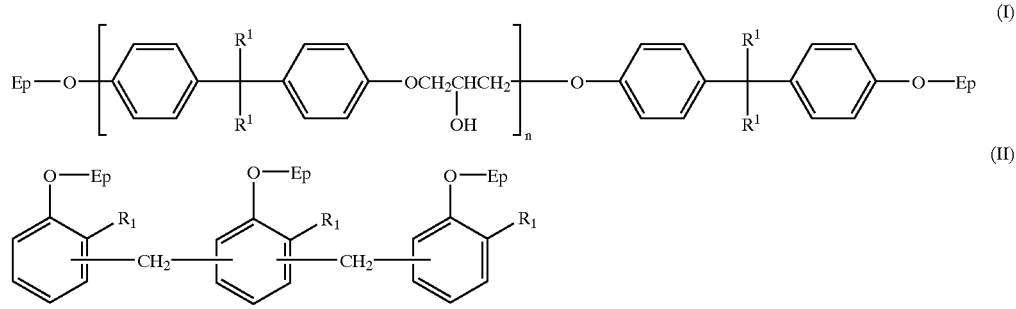

wherein $R^1$ is a hydrogen atom or a methyl group; n is an integer of 0 to 40; and Ep represents the following chemical formula.

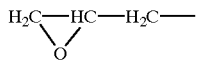

It is also possible to use various aromatic epoxy compounds obtained from phenolic compounds with a valence of 2 or more and epichlorohydrin. Examples of such aromatic epoxy compounds are hydroquinone diglycidyl ether, resorcin diglycidyl ethers, biphenol diglycidyl ether, and 3,3',5,5'-tetramethylbiphenol diglycidyl ether.

In the compounds mentioned above, bisphenol A type epoxy compounds represented by the formula (I) and polyglycidyl ethers of orthocresol novolak resins represented by the formula (II) are preferred, and bisphenol A diglycidyl ether (n in the formula (I) is 0) and their oligomers are especially preferred.

Bisphenol A diglycidyl ethers are commercially available under the trade names of "Epikote 827" and "Epikote 828", their oligomers under the trade names of "Epikote 834", "Epikote 1010", "Epikote 1004", etc., and the compounds of the formula (II) under the trade names of "Epikote 152", "Epikote 154" and "Epikote 180S65", all from Japan Epoxy Resin Co., Ltd.

The hydrogenation catalysts usable in the present invention are the catalysts comprising mainly a platinum group element as active component. Of these catalysts, rhodium (Rh) or ruthenium (Ru) catalysts are preferred, and also the catalysts in which the active component is supported on a carrier are preferred. As the carrier, carbonaceous carriers and oxide carriers are preferred. Typical examples of carbonaceous carriers usable here are activated carbon, graphite and carbon black. Typical examples of oxide carriers usable here are silica, alumina and titania. The carbonaceous carriers are more preferred. Especially, graphite of the type called "high surface area graphite" is preferred. The specific surface area of the said carbonaceous carriers is usually 5 to 600 $m^2/g$, and their particle size is usually 5 to 500 $\mu$m.

For the preparation of the hydrogenation catalysts, there can be used, for instance, the method described in Japanese Patent Application Laid-Open (KOKAI) No. 11-217379.

As reaction solvent for the hydrogenation reaction, there can be used etheric, esteric, alcoholic, paraffinic or like solvents which are stable against hydrogenation and non-toxic to the catalysts.

In the present invention, the said hydrogenation reaction is preferably carried out in the presence of a reaction solvent in which the content of the esteric solvent is 50% by weight. Use of such a reaction solvent makes it possible to reduce the concentration of the metallic component of the catalyst in the alicyclic epoxy compound. Examples of the esteric solvents include fatty acid esters, carbonic acid esters and lactones, of which fatty acid esters are preferred. In view of handling qualities, those fatty acid esters whose boiling point under normal pressure is 50 to 180° C. are preferred. Examples of such fatty acid esters are methyl acetate, ethyl acetate, propyl acetate, butyl acetate, amyl acetate, methyl propionate, propyl propionate, butyl propionate, methyl butyrate, ethyl butyrate, and methyl isovalerate. Of these fatty acid esters, acetic esters and propionic esters, specifically ethyl acetate, propyl acetate, butyl acetate and methyl propionate are preferred. Ethyl acetate is especially preferred.

Esteric solvents may be used in admixture with etheric, alcoholic and paraffinic solvents which are widely used in the art, but in view of the properties of obtained epoxy compound in the present invention, the ratio of the esteric solvent is usually not less than 50% by weight, preferably not less than 90% by weight, based on the admixed solvent. Further, in view of the properties of obtained epoxy compound in the present invention and safety of producing process, it is preferable that substantially no etheric solvent is contained. Specifically, the content of etheric solvent is defined to be not more than 1% by weight.

In the present invention, reaction solvent is used in a ratio by weight to the starting epoxy compound in the range of 0.05 to 10, preferably 0.1 to 3. When the amount of reaction solvent is too small, since generally the viscosity of epoxy compound used as starting material is high, diffusion of hydrogen may be impaired to cause a reduction of reaction rate or worsening of selectivity of the hydrogenation reaction. On the other hand, when the amount of reaction solvent is too large, productivity may lower resulting in poor economy.

Reaction temperature is usually 30 to 150° C., preferably 50 to 130° C. A too low reaction temperature leads to a reduction of reaction rate, necessitating a large amount of hydrogenation catalyst and a long time for completing the reaction. A too high reaction temperature invites an increase of side reactions such as hydrogenation decomposition of epoxy group, resulting in degradation of product quality. Reaction pressure is usually in the range of 1 to 30 MPa, preferably 3 to 15 MPa. A too low reaction pressure causes a reduction of reaction rate and necessitates a large amount of hydrogenation catalyst and a long time for completing the reaction. A too high reaction pressure necessitates scale-up of the equipment to invite bad economy.

The reaction system may be either liquid phase suspension reaction or fixed bed reaction, the former being preferred. Hydrogen may be introduced by a circulation system or by supplying only an amount to be consumed. Also, hydrogen may be introduced into and dispersed in the liquid, or it may be brought into and absorbed in the liquid by suitable means such as stirring. The end point of reaction can be determined by monitoring hydrogen absorption or by sampling analysis.

After the conclusion of the reaction, catalyst is separated from the reaction solution by a suitable operation such as filtration or centrifugation, and then reaction solvent is removed by distillation to obtain the objective product. Distillation for removing reaction solvent is carried out usually at 50 to 200° C., preferably at 70 to 150° C., under reduced pressure. In view of the influences on the environment, especially offensive smell, in use of the product, the residual amount of reaction solvent should be usually not more than 1% by weight, preferably not more than 0.2% by weight. The lower limit of residual amount of reaction solvent is usually 0.001% by weight. Further distillation removal of reaction solvent requires long-time heating, which invokes the risk of deteriorating stability of the product quality. For further decrease of residual amount of reaction solvent, introduction of an inert gas such as nitrogen gas is effective.

In the present invention, the amount of platinum group element in the alicyclic epoxy compound can be reduced by a method in which epoxy compound obtained by hydrogenating reaction is brought into contact with an adsorbent. Further, if necessary, the following methods (1) to (5) can be used in combination with the above method.
(1) Preparing a catalyst to be used for the hydrogenation reaction.
(2) Selecting the optimum hydrogenation reaction conditions.
(3) The platinum group element dissolved in the solution is precipitated by reduction.
(4) The dissolved platinum group element is removed by liquid-liquid extraction.
(5) The epoxy compound is recovered as a distillate by vacuum distillation.

Foe example, by using the means (3)–(5) in combination, the platinum group element can be removed from the product of epoxy compound, it may be possible to elute the platinum group element from the hydrogenation catalyst so that the variation of (1) preparation of catalyst is widened and it is possible to improve the productivity of alicyclic epoxy compound per unit amount of catalyst by elevating the reaction temperature in (2) hydrogenation reaction condition or to reduce a load to adsorbent treatment.

As the above adsorbent, activated carbon, activated clay, ion exchange resins, synthetic adsorbents and the like can be used. Of these, activated carbon is preferred. The active surface of the adsorbent may be either acidic, neutral or basic. Of these, basic is preferred. Examples of the basic adsorbents include solid basic compounds such as magnesium oxide, basic ion exchange resins and basic activated carbon.

As the adsorption method, there can be used either a method comprising batchwise contacting treatment with a powdery adsorbent or a method comprising passing through the adsorbent packed bed. An adsorbent having an average particle size of 1 to 1,000 μm is preferred for use as powdery adsorbent, and an adsorbent having an average grain size of 1 to 10 mm can be preferred used as granular adsorbent.

The type of activated carbon to be used in the present invention is not specified; it is possible to use various types of activated carbon produced from various materials such as coconut shell, wood, coal, etc. Various types of activated carbon produced from various types of materials can be used. He preferred activated carbon is an activated carbon having basic surface property. Concretely, there is preferred an activated carbon in which the pH of slurry obtained from dispersing the activated carbon in water is 8 to 12. The said pH is measured by JIS K-1470: test method for powder activated carbon. The specific surface area of activated carbon preferably falls within the range of 500 to 3,000 $m^2/g$.

The amount of adsorbent used, although variable depending on the type of adsorbent used, is usually 0.01 to 100% by weight, preferably 0.1 to 20% by weight, more preferably 0.2 to 10% by weight based on the epoxy compound contained in the treated solution. When the amount of adsorbent used is less than 0.01% by weight, the effect of adsorbent may be insufficient. When the amount of adsorbent used is more than 100% by weight, the loss of product by adsorption may increase.

Contact treatment is carried out at a temperature of usually 0 to 100° C., preferably 10 to 80° C. In view of workability, recovery rate and adsorbing efficiency, this contact treatment is preferably conducted in a state containing a solvent. The type of the solvent used here is not specifically defined as far as it is capable of dissolving the epoxy compound used. Since the said refining step is usually conducted before the reaction solution is concentrated, the reaction solvent can be used in the form as it is. The solvent content is normally 5 to 80% by weight in terms of concentration in the solution. When the amount of solvent is too small, the viscosity of the treated solution is controlled by adding the solvent optionally, to enhance the adsorbing efficiency.

In the present invention, after the end of the hydrogenation reaction, an adsorbent may be put into and mixed with the reaction solution without separating the hydrogenation catalyst so that both catalyst and adsorbent can be subjected together to solid-liquid separation. The following advantages are credited to this method.

In case where solid-liquid separation of catalyst is conducted without adding an adsorbent to the reaction solution after hydrogenation reaction, the solid-liquid separating performance is reduced by the presence of organic matter adhering to the catalyst surface. On the other hand, in case where solid-liquid separation of both catalyst and adsorbent (especially activated carbon) is carried out according to the said method, the solid-liquid separating performance is remarkably enhanced. Of course, the removing efficiency of the platinum group element is almost unchanged in this method. When carrying out solid-liquid separation of both catalyst and adsorbent, the amount of adsorbent used is preferably specified to be 1 to 30 in ratio by weight to the catalyst.

The concentration of platinum group element in the alicyclic epoxy compound needs to be not more than 2 ppm in use encapsulant for LED. Preferably, it is not more than 1 ppm, more preferably not more than 0.5 ppm, and should be not more than 0.1 ppm in specific uses where product quality requirements are strict. When the concentration of platinum group element in the alicyclic epoxy compound is more than 2 ppm, the transmittance of alicyclic epoxy compound in visible region and ultraviolet region may be decreased or the transmittance of composition comprising alicyclic epoxy compound as a main component may be decreased by ultraviolet light with time.

Assaying of the platinum group element can be made by known methods such as atomic-absorption spectroscopy or ICP emission spectroscopic analysis by directly diluting the sample in a solvent or, after burning the organic matter, adding potassium pyrosulfate to conduct wet decomposition and dissolving the resulting product in an aqueous solution.

A noticeable effect of the presence of platinum group element on the product is a reduction of transmittance of the product. Such reduction of transmittance is large in the short wavelength region. This can be quantified by the ratio of the value of transmittance at 400 nm to that at 700 nm (through a 1 cm quartz cell) as: $K=T400/T700$.

Thus, the more the ratio of transmittance (value of K) approaches 1, the less becomes the color shading. Also, the greater the value of platinum group element, the smaller becomes the value of K below 1, increasing absorption in the short wavelength region. The value of K is preferably not less than 0.9. When the value of K becomes greater than 1 due to the causes other than platinum group element, it is preferable that the value of K is not greater than 1.1. Absorption in the ultraviolet region can be measured from transmittance at 340 nm. In view of stability of the encapsulant in the ultraviolet region, transmittance at 340 nm is preferably not lower than 80%, more preferably not lower than 90%.

In the alicyclic epoxy compound according to the present invention, the hydrogenation rate of aromatic ring is usually not less than 85%, preferably not less than 95%, more preferably not less than 98%. When the hydrogenation rate of aromatic ring is less than 85%, the reproducibility, uniformity and stability of hue in the cured epoxy resin may be deteriorated and the radial luminous intensity of LED with time may be decreased. The hydrogenation rate of aromatic ring means a percentage of change from aromatic ring to alicyclic ring and can be determined by Nuclear Magnetic Resonance Spectrum (NMR) and absorbance methods.

In the alicyclic epoxy compound according to the present invention, the degradation rate of epoxy group is preferably not more than 20%. The degradation rate of epoxy group means a percentage of change from epoxy group to other group such as hydroxyl group by degradation. When the degradation rate of epoxy group is more than 20%, the heat resistance of cured epoxy resin may be deteriorated. The degradation rate of epoxy group can be determined from the theoretic epoxy equivalent in case where hydrogenation reaction is conducted for only aromatic ring and the epoxy equivalent of obtained product. The epoxy equivalent can be measured by known method such as titration with perchloric acid. Further, the degradation rate of epoxy group can be determined by directly measuring the epoxy degradate by gas chromatography.

In the alicyclic epoxy compound according to the present invention, chlorine content is preferably not more than 0.3% by weight. The chlorine content means the total amount of organic chlorine and inorganic chlorine contained in the alicyclic epoxy compound. When the chlorine content is more than 0.3% by weight, the humidity resistance, electrical properties at high temperature and weather resistance may be deteriorated so that it may be not preferable to use for an epoxy compound in electric and electronic arts. The chlorine content can be determined by a method comprising reacting chlorine contained in the epoxy compound with sodium biphenyl and titrating the reaction product with silver nitrate.

Alicyclic epoxy compounds are mixed with an epoxy resin curing agent and if necessary further mixed with other alicyclic epoxy compounds and/or adjuvants to form an alicyclic epoxy resin composition. The said alicyclic epoxy resin composition can be used as an encapsulant for LED.

It is an essential requirement to reduce the concentration of platinum group element in the above alicyclic epoxy resin composition (encapsulant for LED). Namely, the concentration of platinum group element in the alicyclic epoxy resin composition (encapsulant for LED) is defined as not more than 2 ppm, preferably not more than 1 ppm, more preferably not more than 0.5 ppm, especially preferably not more than 0.1 ppm, to be the same as that in alicyclic epoxy compounds specified above.

As curing agent, amines, acid anhydrides, polyhydric phenols, imidazoles, Brønsted acid salts, dicyandiamides, organic acid hydrazides, polymercaptans, organic phosphines and the like can be used. Of these, acid anhydrides being preferred.

Examples of acid anhydrides preferred for use in the present invention include aromatic acid anhydrides such as phthalic anhydride, trimellitic anhydride and pyromellitic anhydride, and alicyclic acid anhydrides such as tetrahydrophthalic anhydride, methyltetrahydrophthalic anhydride, hexahydrophthalic anhydride, methylhexahydrophthalic anhydride, methyl endo-methylenetetrahydrophthalic anhydride, dodecenylsuccinic anhydride and trialkyltetrahydrophthalic anhydride. Of these compounds, alicyclic acid anhydrides, especially hexahydrophthalic anhydride and methylhexahydrophthalic anhydride, which are saturated aliphatic compounds, are preferred.

These curing agents may be used either individually or as a combination of two or more, but their amount is preferably adjusted so that the ratio of aromatic compounds in the whole curing agent will be not more than 10% by weight. The amount of curing agent(s) used is usually 0.01 to 200 parts by weight, preferably 0.1 to 150 parts by weight, based on 100 parts by weight of the alicyclic epoxy compound.

Representative examples of the said other alicyclic epoxy compounds are epoxidizates of cycloolefins such as 3,4-epoxycyclohexylmethyl-3',4'-epoxycyclohexacarboxylate. Such other alicyclic epoxy compounds, when used, are added in an amount of usually 0.01 to 10, preferably 0.05 to 1 in ratio by weight to the said alicyclic epoxy compound according to the present invention.

Examples of the other adjuvants may include curing promoters, antioxidant, UV absorbers, reinforce agents, fillers, colorants, pigments and flame retardants. In case of the encapsulant for LED, there can be mentioned phosphors. Since phosphors excited by receipt of light emitting from the luminous element, it can emit a light having more longer wave length than the wave length of excited light.

As the luminous element applicable to the encapsulant for LED according to the present invention, semiconductor of group III-nitrogen compound can be mentioned as an example. The main wave length of emitted light from the luminous element is preferably 350 to 550 nm, especially preferably 360 to 480 nm. The concrete structure of LED comprising a luminous element encapsulated by a encapsulant is described in, for examples, Japanese Laid-Open (KOKAI) No. 59-54277 and Japanese Patent No. 2927279. The encapsulant for LED according to the present invention has an advantage of small deterioration with age in the above wave length.

According to the present invention described above, there are provided alicyclic epoxy compounds which are limited in change of reproducibility, uniformity and stability of hue and also capable of minimizing reduction of radial luminous intensity of LED with time, so the industrial value of the present invention is salient.

EXAMPLES

The present invention is further explained with reference to the examples thereof, which examples however are merely intended to be illustrative and not to be construed as limiting the scope of the invention in any way. The analytical methods and the properties determination methods used in the Examples and Comparative Examples are as described below.

(1) Analysis of Platinum Group Element in Product

Analysis of platinum group element was made by atomic-absorption spectroscopy using specimens dissolved in ethanol. More specifically, using as analyzer GF-AAS Spectra AA-300 mfd. by Varian Technologies Japan Ltd., calibration curve was drawn based on a platinum group element standard solution, and the dilution with ethanol was varied to provide 5- to 5,000-fold dilution according to the platinum group element concentration in the specimen so that this concentration would fall in the concentration range of the calibration curve. The lower threshold limit of rhodium analysis in this method was 0.02 ppm, and that of ruthenium analysis was 0.2 ppm.

(2) Hydrogenation Rate of Aromatic Ring of Product

Using the specimen dissolved in ethyl acetate, its absorbance at 275 nm was measured and the hydrogenation rate was determined from comparison of the measured absorbance of the specimen with that of the starting aromatic epoxy compound. The dilution with ethyl acetate varied between 10 and 1,000 fold according to the hydrogenation rate.

(3) Epoxy Equivalent

According to JIS K7236-1995, the specimen was titrated with perchloric acid in the presence of acetic acid and cetyltrimethylammonium bromide, the generated hydrogen bromide was added to the epoxy group, and the end point of titration was judged by the potential difference. The product was used as specimen without dilution.

(4) Degradation Rate of Epoxy Group

The degradation rate of epoxy group was calculated by the following equation. In case where the EPIKOAT 828US produced by Japan Epoxy Resin Co., Ltd. (epoxy equivalent: 186) is used as a material, the theoretical epoxy equivalent group is 192.

Degradation rate of epoxy group={1−(theoretical epoxy equivalent when only aromatic ring is hydrogenated)/(Epoxy equivalent of product)}×100

(5) Chlorine Content

The chlorine content can be determined by a method comprising reacting chlorine contained in the epoxy compound with sodium biphenyl and titrating the reaction product with silver nitrate.

(6) Transmittance

Using UV-2400PC mfd. by Shimadzu Corp., transmittance was measured using 1 cm cells with distilled water as blank. Product was used as specimen without dilution.

Example 1

400 g of a bisphenol A type epoxy compound (Epikote 828EL produced by Japan Epoxy Resin Co., Ltd.; epoxy equivalent: 186), 100 g of tetrahydrofuran, and 1.2 g of a 5 wt % rhodium/graphite catalyst as hydrogenation catalyst were supplied to a 1-litre induction stirring type autoclave. The autoclave atmosphere was replaced with nitrogen and then with hydrogen, and hydrogenation reaction was carried out at 110° C. under a hydrogen pressure of 8 MPa. Absorption of hydrogen substantially ceased in 3 hours.

After a reaction solvent (tetrahydrofuran) was added into the obtained reaction mixture to dilute the thereof so as to control the epoxy resin concentration to 50% by weight, hydrogenation catalyst was filtered out from the reaction mixture by using a 5C filter paper. Filtration was conducted with a 1-litre filter under a pressure of 0.05 MPa for one hour. 16 g of activated carbon having pH 5 to 8 (Taiko K (dry product) produced by Futamura Chemical Industries Co., Ltd.) was supplied into the reaction solution, and after 30-minute mixing, activated carbon was filtered out. Then the reaction solvent was distilled away while blowing a small quantity of nitrogen through the solution under reduced pressure at 100° C. to obtain a transparent product. The results of analyses of the product are shown in Tables 1 and 2.

Example 2

The same procedure as defined in Example 1 was conducted except that activated carbon was supplied in an amount of 24 g instead of 16 g. The results were as shown in Tables 1 and 2.

Example 3

The same procedure as defined in Example 1 was conducted except that ethyl acetate was used as reaction solvent instead of tetrahydrofuran, and that the amount of activated carbon supplied was reduced to 4 g. The results are shown in Tables 1 and 2.

Example 4

After carrying out hydrogenation reaction under the conditions of Example 1, 16 g of activated carbon was added to the reaction solution before separation of hydrogenation catalyst and mixed for 30 minutes. Then the mixture of activated carbon and catalyst was filtered under the same conditions as in Example 1. The time used for the filtration was 5 minutes. The results are shown in Tables 1 and 2.

Comparative Example 1

The same procedure as defined in Example 1 was conducted except that no adsorption treatment with activated carbon was practiced. The results were as shown in Tables 1 and 2.

Comparative Example 2

The same procedure as defined in Example 1 was conducted except that unreduced type of 5 wt % Rh/graphite was used as hydrogenation catalyst. The results are shown in Tables 1 and 2.

TABLE 1

|  | Example 1 | Example 2 | Example 3 | Example 4 | Comp. Example 1 | Comp. Example 2 |
|---|---|---|---|---|---|---|
| Reaction solvent | THF | THF | Ethyl acetate | THF | THF | THF |
| Activated carbon concentration, based on epoxy compound (wt %) | 4 | 6 | 1 | 4 | — | 4 |
| Rh concentration (ppm) | 0.4 | ≦0.02 | 0.2 | 0.5 | 9 | 8 |
| Hydrogenation rate (%) | 99.8 | 99.8 | 99.7 | 99.8 | 99.9 | 99.8 |
| Epoxy equivalent | 202 | 202 | 201 | 203 | 206 | 205 |
| Degradation rate of epoxy group (%) | 5.0 | 5.0 | 4.5 | 5.4 | 6.8 | 6.3 |

TABLE 2

|  | Examples | | | | Comp. Examples | |
|---|---|---|---|---|---|---|
|  | 1 | 2 | 3 | 4 | 1 | 2 |
| Chlorine content (wt %) | 0.15 | 0.15 | 0.15 | 0.15 | 0.15 | 0.15 |
| Transmittance (%) | | | | | | |
| 340 nm | 94.8 | 96.9 | 93.2 | 94.5 | 17.5 | 20.5 |
| 400 nm | 97.4 | 99.6 | 96.9 | 97.3 | 28.3 | 28.9 |
| 700 nm | 99.4 | 100.6 | 98.9 | 99.2 | 47.2 | 49.8 |
| K value T400/T700 | 0.98 | 0.99 | 0.98 | 0.98 | 0.60 | 0.58 |

Example 5

200 g of a bisphenol A type epoxy compound (Epikote 828US produced by Japan Epoxy Resin Co., Ltd.; epoxy equivalent: 186), 200 g of ethyl acetate, and 20 g of a 5 wt % ruthenium/activated carbon catalyst (A Type produced by N. E. Chemcat Corp.) as hydrogenation catalyst were supplied to a 1-litre induction stirring type autoclave. The autoclave atmosphere was replaced with nitrogen and then with hydrogen, and hydrogenation reaction was carried out at 60° C. under a hydrogen pressure of 8 MPa. After cooling, a small quantity of the reaction product was sampled out and diluted with ethyl acetate. After filtering out the catalyst, the solvent was distilled away while blowing a small quantity of nitrogen through the solution at 100° C. under reduced pressure to obtain a product. The analytical results of the product were as shown in Tables 3 and 4.

Example 6

Ethyl acetate was added to the reaction mixture of Example 5 to dilute it to an epoxy resin concentration of 50%, and then activated carbon (Taiko K (dry product) produced by Futamura Chemical Industries Co., Ltd.) was added in an amount of 5% by weight based on the epoxy resin. After one-hour mixing, the mixture was filtered. Then the solvent was distilled away from the filtrate in the same way as in Example 1 to obtain a product. The analytical results of the product are shown in Tables 3 and 4.

Example 7

400 g of a bisphenol A type epoxy compound (Epikote 828US produced by Japan Epoxy Resin Co., Ltd.; epoxy equivalent: 186), 100 g of ethyl acetate and 6 g of a 5 wt % ruthenium/activated carbon catalyst (B Type produced by N. E. Chemcat Corp.) as hydrogenation catalyst were supplied to a 1-litre induced stirring type autoclave. The autoclave atmosphere was replaced with nitrogen and then with hydrogen, and hydrogenation reaction was carried out at 110° C. under a hydrogen pressure of 8 MPa for 7 hours. Since the reaction did not proceed sufficiently, 6 g of hydrogenation catalyst was added to the reaction solution to further carry out hydrogenation under the same conditions for 7 hours.

After cooling, ethyl acetate was added to the reaction mixture to dilute it to an epoxy resin concentration of 50%, after which magnesium oxide (Kyowamag 150 produced by Kyowa Chemical Industry Co., Ltd.) was added in an amount of 10% by weight based on the epoxy resin and mixed for one hour, and the mixture was filtered. The solvent was distilled away from the filtrate in the same way as in Example 1 to obtain a product. The analytical results of the product are shown in Tables 3 and 4.

Comparative Example 3

The same procedure as defined in Example 7 was conducted except that no magnesium oxide was added. The analytical results of the product are shown in Tables 3 and 4.

TABLE 3

|  | Example 5 | Example 6 | Example 7 | Comp. Example 3 |
|---|---|---|---|---|
| Reaction solvent | Ethyl acetate | Ethyl acetate | Ethyl acetate | Ethyl acetate |
| Adsorbent concentration based on epoxy compound (wt %) | — | Activated Carbon (5) | MgO (10) | — |
| Ru concentration (ppm) | 2 | <0.2 | <0.2 | 38 |
| Hydrogenation rate (%) | 90.4 | 90.4 | 93.7 | 93.7 |
| Epoxy equivalent | 207 | 207 | 323 | 323 |
| Degradation rate of epoxy group (%) | 7.2 | 7.2 | 40.6 | 40.6 |

TABLE 4

|  | Example 5 | Example 6 | Example 7 | Comp. Example 3 |
|---|---|---|---|---|
| Chlorine content (wt %) | 0.15 | 0.15 | 0.15 | 0.15 |
| Transmittance (%) | | | | |
| 340 nm | 83.7 | 96.0 | 93.5 | 1.5 |
| 400 nm | 91.2 | 97.8 | 98.6 | 4.3 |
| 700 nm | 97.7 | 98.8 | 100 | 29.4 |
| K value T400/T700 | 0.93 | 0.99 | 0.98 | 0.15 |

Example 8

30 g of a bisphenol A type epoxy compound (Epikote 828EL produced by Japan Epoxy Resin Co., Ltd.: epoxy equivalent: 186), 30 g of ethyl acetate and 0.2 g of a 5 wt % rhodium/graphite catalyst as hydrogenation catalyst were supplied to a 200-ml induced stirring type autoclave. The autoclave atmosphere was replaced with nitrogen and then with hydrogen, and hydrogenation reaction was carried out at 110° C. under a hydrogen pressure of 7 MPa until hydrogen absorption substantially ceased. Reaction time was 140 minutes.

The reaction solution was passed through a 5C filter paper to remove the hydrogenation catalyst. Then the reaction solvent was distilled away while blowing a small quantity of nitrogen through the solution at 100° C. under reduced pressure to obtain a substantially transparent product. The analytical results of this product are shown in Tables 5 and 6.

Comparative Example 4

The same procedure as defined in Example 8 was conducted except that tetrahydrofuran was, used in place of ethyl acetate as reaction solvent. The results are shown in Tables 5 and 6.

Comparative Example 5

The same procedure as defined in Example 8 was conducted except that cyclohexane was used as reaction solvent. The results are shown in Tables 5 and 6.

Comparative Example 6

The same procedure as defined in Example 8 was conducted except that n-butanol was used as reaction solvent. The results are shown in Tables 5 and 6.

Example 9

400 g of a bisphenol A type epoxy compound (Epikote 828EL produced by Japan Epoxy Resin Co., Ltd.; epoxy equivalent: 186), 100 g of ethyl acetate and 2.4 g of a 5 wt % rhodium/graphite catalyst as hydrogenation catalyst were supplied to a 1-litre induced stirring type autoclave. The autoclave atmosphere was replaced with nitrogen and then with hydrogen, and hydrogenation reaction was carried out at 110° C. under a hydrogen pressure of 8 MPa until hydrogen absorption substantially ceased. Reaction time was 3 hours.

The reaction solution was diluted with a reaction solvent to a resin concentration of 50%, and then activated carbon (dried Taiko K produced by Futamura Chemical Industries Co., Ltd.) was added in an amount of 2% by weight based on the epoxy resin and mixed by stirring. The reaction solution was passed through a 5C filter paper to remove activated carbon together with hydrogenation catalyst from the reaction solution. Then the reaction solvent was distilled away while blowing a small quantity of nitrogen through the solution at 100° C. under reduced pressure to obtain a product. The analytical results of the product are shown in Tables 5 and 6.

Example 10

The same procedure as defined in Example 9 was conducted except that methyl propionate was used as reaction solvent. The results are shown in Tables 5 and 6.

TABLE 5

|  | Example 8 | Comp. Example 4 | Comp. Example 5 | Comp. Example 6 | Example 9 | Example 10 |
| --- | --- | --- | --- | --- | --- | --- |
| Reaction solvent | Ethyl acetate | THF | Cyclohexane | n-butanol | Ethyl acetate | Methyl propionate |

TABLE 5-continued

|  | Example 8 | Comp. Example 4 | Comp. Example 5 | Comp. Example 6 | Example 9 | Example 10 |
| --- | --- | --- | --- | --- | --- | --- |
| Adsorbent concentration based on epoxy compound (wt %) | — | — | — | — | Activated Carbon (2) | Activated Carbon (2) |
| Rh or Ru concentration (ppm) | 0.5 (Rh) | 7 (Rh) | 3 (Rh) | 12 (Rh) | 0.1 (Rh) | 0.1 (Rh) |
| Hydrogenation rate (%) | 97.9 | 99.6 | 97.6 | 98 | 99.5 | 99.6 |
| Epoxy equivalent | 198 | 200 | 200 | 209 | 200 | 200 |
| Degradation rate of epoxy group (%) | 3.0 | 4.0 | 4.0 | 8.1 | 4.0 | 4.0 |

TABLE 6

|  | Example 8 | Comp. Example 4 | Comp. Example 5 | Comp. Example 6 | Example 9 | Example 10 |
| --- | --- | --- | --- | --- | --- | --- |
| Chlorine content (wt %) | 0.15 | 0.15 | 0.15 | 0.15 | 0.15 | 0.15 |
| Transmittance (%) |  |  |  |  |  |  |
| 340 nm | 89 | 39 | 65 | 21 | 95.6 | 95.9 |
| 400 nm | 94 | 47 | 73 | 27 | 98 | 98.2 |
| 700 nm | 98 | 65 | 87 | 46 | 100 | 100.2 |
| K value T400/T700 | 0.96 | 0.72 | 0.84 | 0.59 | 0.98 | 0.98 |

Examples 11–13

After the same hydrogenation reaction as defined in Example 1 except for using ethyl acetate as the reaction solvent was conducted, ethyl acetate was added into the reaction mixture so as to control the epoxy resin concentration to 50% by weight and thereafter the hydrogenation catalyst was filtered. 0.1 g of activated carbon (0.5% by weight based on the epoxy resin) was added into the obtained filtrate (40 g) and mixed with stirring for one hour. As the above activated carbon, acid-washed product, neutral product and basic product (all produced by Wako Pure Chemicals Industries, Ltd) were used, respectively. After filtration, ethyl acetate was removed from the obtained filtrate to obtain transparent product. The analytical results of this product are shown in Tables 7 and 8. The pH of activated carbon was measured by JIS K-1470: test method for powder activated carbon.

TABLE 7

|  | Example 11 | Example 12 | Example 13 |
| --- | --- | --- | --- |
| Kind of activated carbon (pH) | Acid-washed product (7.0) | Neutral Product (6.9) | Basic Product (10.5) |
| Rh concentration (ppm) | 1.5 | 1.1 | 0.1 |
| Hydrogenation rate (%) | 99.7 | 99.7 | 99.7 |
| Epoxy equivalent | 201 | 201 | 201 |

TABLE 7-continued

|  | Example 11 | Example 12 | Example 13 |
|---|---|---|---|
| Degradation rate of epoxy group (%) | 4.5 | 4.5 | 4.5 |

TABLE 8

|  | Example 11 | Example 12 | Example 13 |
|---|---|---|---|
| Chlorine content (wt %) | 0.15 | 0.15 | 0.15 |
| Transmittance (%) |  |  |  |
| 340 nm | 84.8 | 87.2 | 97.5 |
| 400 nm | 88.0 | 90.6 | 98.6 |
| 700 nm | 94.6 | 96.0 | 99.8 |
| K value T400/T700 | 0.90 | 0.91 | 0.98 |

Example 14

750 kg of a bisphenol A type epoxy compound (Epikote 828US produced by Japan Epoxy Resin Co., Ltd.; epoxy equivalent: 186), 188 kg of ethyl acetate, and 2.3 kg of a 5 wt % rhodium/graphite catalyst as hydrogenation catalyst were supplied to a 1300-litre autoclave replaced with nitrogen. The autoclave atmosphere was replaced with hydrogen, and hydrogenation reaction was carried out at 110° C. under a hydrogen pressure of 8 Mpa for 8 hours.

Then, 15 kg of activated carbon having pH 5 to 8 (Taiko K (dry product) produced by Futamura Chemical Industries Co., Ltd.) and 560 kg of ethyl acetate were supplied into the reaction solution, and after 30-minute mixing, the activated carbon was filtered out from the reaction mixture. Then the reaction solvent was distilled away while blowing a small quantity of nitrogen through the solution under reduced pressure at 100° C. to obtain a transparent product. The results of analyses of the product are shown in Tables 9 and 10.

TABLE 9

|  | Example 14 |
|---|---|
| Reaction solvent | Ethyl acetate |
| Concentration of activated carbon Based on epoxy compound (wt %) | 2 |
| Rh concentration (ppm) | <0.02 |
| Hydrogenation rate (%) | 99.9 |
| Epoxy equivalent | 205 |
| Degradation rate of epoxy group (%) | 6.3 |

TABLE 10

|  | Example 14 |
|---|---|
| Chlorine content (wt %) | 0.15 |
| Transmittance (%) |  |
| 340 nm | 97.0 |
| 400 nm | 99.5 |
| 700 nm | 100 |
| K value T400/T700 | 1.00 |

Example 15

100 g of epoxy resin obtained in Example 14, 83 g of 4-methylhexahydrophthalic anhydride (MH-700 produced by New Japan Chemical Co., Ltd) as a curing agent and 1.0 g of Hishicolin PX-4ET produced by Nippon Chemical Industrial Co., Ltd. as a curing catalyst were mixed, and cast to a plate having 3 mm thickness. This cast plate was pre-cured at 100° C. for 3 hours and thereafter cured at 120° C. for 3 hours. After cooling the plate, the cured plate was cut out to obtain a test piece having 150 mm×75 mm size. The transmittance of the test piece was measured. The deterioration test by ultraviolet light is determined by using Dew Panel Light Control Weather Meter DWPL-5R produced by Suga Test Instruments Co., Ltd. and by the following method. The UV light was continuously radiated to the test piece for 150 hours. The temperature at black panel was 63° C. and the radiation power was 3 mW/cm$^2$. After radiation, the transmittance at the above respective wave lengths was measured again. The results are shown in Tables 11.

Example 16

The same procedure as defined in Example 15 was conducted except for using a mixture of epoxy resin obtained in Example 14 and epoxy resin obtained in Comparative Example 1 (mixing ratio=65:35 by weight) as the epoxy resin, to obtain a test piece. Thereafter, the transmittance at the above respective wave lengths was measured. Rh concentration in the cured test piece was 1.7 ppm. The results are shown in Tables 11.

Comparative Example 7

The same procedure as defined in Example 15 was conducted except for using the epoxy resin obtained in Comparative Example 1 (Rh concentration: 9 ppm) as the epoxy resin, to obtain a test piece. Thereafter, the transmittance at the above respective wave lengths was measured. Rh concentration in the cured test piece was 5.0 ppm. The results are shown in Tables 11.

Comparative Example 8

100 g of aromatic epoxy resin (a bisphenol A type epoxy compound, Epikote 828US produced by Japan Epoxy Resin Co., Ltd.), 90 g of MH-700 produced by New Japan Chemical Co., Ltd as a curing agent and 1.0 g of Hishicolin PX-4ET produced by Nippon Chemical Industrial Co., Ltd. as a curing catalyst were mixed, and cast to a plate having 3 mm thickness. This cast plate was pre-cured at 100° C. for 3 hours and thereafter cured at 120° C. for 3 hours. By using the cured plate, the same procedure as defined in Example 15 was conducted to obtain a test piece and to measure the transmittance. The results are shown in Table 11.

TABLE 11

|  | Example 15 | Example 16 | Comp. Example 7 | Comp. Example 8 |
|---|---|---|---|---|
| Rh concentration in the encapsulant (calculation from epoxy compound) | <0.02 ppm | 1.7 ppm | 5 ppm | — |
| Transmittance (%) (before UV radiation) |  |  |  |  |
| 340 nm | 77 | 68 | 64 | 59 |
| 400 nm | 88 | 77 | 72 | 83 |

TABLE 11-continued

|  | Example 15 | Example 16 | Comp. Example 7 | Comp. Example 8 |
|---|---|---|---|---|
| 700 nm Transmittance (%) (after UV radiation for 150 hours) | 89 | 86 | 83 | 87 |
| 340 nm | 30 | 32 | 21 | 7 |
| 400 nm | 63 | 64 | 49 | 42 |
| 700 nm | 89 | 85 | 81 | 87 |

As seen from Table 11, since the Rh concentrations in the cured epoxy resin in Examples 15 and 16 are low, the transmittances before UV radiation are high and the decreasing of transmittances after UV radiation for 150 hours is small. On the other hand, since the Rh concentrations in the cured epoxy resin in Comparative Example 7 is high, decreasing of transmittances after UV radiation for 150 hours is remarkable. In Comparative Example 8, no Rh is contained, however, since the aromatic ring is contained in the epoxy resin, decreasing of transmittances after UV radiation for 150 hours is also remarkable.

What is claimed is:

1. Alicyclic epoxy compounds obtained by selectively hydrogenating aromatic rings of aromatic epoxy compounds in the presence of a hydrogenation catalyst comprising a platinum group element, the concentration of the platinum group element in the product of alicyclic epoxy compound being not more than 2 ppm.

2. Alicyclic epoxy compounds according to claim 1, wherein the platinum group element is rhodium or ruthenium.

3. Alicyclic epoxy compounds according to claim 1, wherein (a) hydrogenation rate of aromatic ring is not less than 85%, (b) degradation rate of epoxy group is not more than 20% and (c) chlorine content is not more than 0.3% by weight.

4. An alicyclic epoxy resin composition comprising alicyclic epoxy compound as main component, which alicyclic epoxy compound is obtained by selectively hydrogenating aromatic rings of aromatic epoxy compounds in the presence of a hydrogenation catalyst comprising a platinum group element, the concentration of the platinum group element in the alicyclic epoxy resin composition being not more than 2 ppm.

5. An alicyclic epoxy resin composition according to claim 4, wherein the platinum group element is rhodium or ruthenium.

6. An encapsulant for light-emitting diode comprising the alicyclic epoxy resin composition as defined in claim 4.

7. A process for producing an alicyclic epoxy compound which comprises selectively hydrogenating aromatic ring of an aromatic epoxy compound in the presence of a hydrogenation catalyst, and bringing the obtained alicyclic epoxy compound into contact with an adsorbent to remove the platinum group element in said alicyclic epoxy compound.

8. The process according to claim 7, wherein the hydrogenation catalyst comprises active component carried on a carrier.

9. The process according to claim 7, wherein the hydrogenation catalyst comprises a platinum group element as active component.

10. The process according to claim 9, wherein the platinum group element is rhodium or ruthenium.

11. The process according to claim 7, wherein the reaction is carried out in the presence of a reaction solvent in which the content of an esteric solvent is not less than 50% by weight.

12. The process according to claim 11, wherein the reaction solvent contains substantially no etheric solvent.

13. The process according to claim 11, wherein the esteric solvent is a fatty acid ester.

14. The process according to claim 11, wherein the boiling point of the esteric solvent under normal pressure is in the range of 50 to 180° C.

15. The process according to claim 11, wherein the esteric solvent comprises an acetic ester or a propionic ester as main component.

16. The process according to claim 7, wherein the aromatic epoxy compound is a condensate of bisphenol A and epichlorohydrin.

17. The process according to claim 7, wherein the adsorbent is activated carbon.

18. The process according to claim 7, wherein the adsorbent is a basic adsorbent.

19. The process according to claim 7, wherein the adsorbent is a compound comprising magnesium oxide as main component.

20. The process according to claim 7, wherein the reaction solution containing the alicyclic epoxy compound obtained from the hydrogenation reaction is brought into contact with an adsorbent.

21. The process according to claim 7, wherein the concentration of the platinum group element in the obtained alicyclic epoxy compound is not more than 2 ppm.

* * * * *